US009746018B2

(12) United States Patent
Williams et al.

(10) Patent No.: US 9,746,018 B2
(45) Date of Patent: Aug. 29, 2017

(54) SPEED NUT

(71) Applicants: DENSO International America, Inc., Southfield, MI (US); DENSO CORPORATION, Kariya, Aichi-pref. (JP)

(72) Inventors: Mark Williams, Gaines, MI (US); Blaise Didonato, Waterford Township, MI (US)

(73) Assignees: Denso International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/881,304

(22) Filed: Oct. 13, 2015

(65) Prior Publication Data
US 2016/0223010 A1   Aug. 4, 2016

Related U.S. Application Data

(60) Provisional application No. 62/110,729, filed on Feb. 2, 2015.

(51) Int. Cl.
*F16B 21/18* (2006.01)
*F16B 37/02* (2006.01)
*F16B 37/04* (2006.01)
*F16B 37/08* (2006.01)

(52) U.S. Cl.
CPC .......... *F16B 37/02* (2013.01); *F16B 37/041* (2013.01); *F16B 37/0842* (2013.01)

(58) Field of Classification Search
CPC ........ F16B 21/18; F16B 37/02; F16B 37/041; F16B 37/044; F16B 37/08; F16B 37/0842
USPC .......................... 411/525–526, 527, 528–529
See application file for complete search history.

(56) References Cited

U.S. PATENT DOCUMENTS

| 2,101,287 | A | * | 12/1937 | Tinnerman | ............ | F16B 37/041 |
| | | | | | | 126/39 B |
| 2,117,775 | A | * | 5/1938 | Tinnerman | .............. | F16B 37/02 |
| | | | | | | 411/520 |
| 2,192,087 | A | * | 2/1940 | Kost | ...................... | F16B 21/20 |
| | | | | | | 411/528 |
| 2,236,929 | A | * | 4/1941 | Tinnerman | .............. | F16B 21/20 |
| | | | | | | 411/527 |
| 2,267,436 | A | * | 12/1941 | Thompson | .............. | F16B 37/02 |
| | | | | | | 411/259 |
| 2,323,689 | A | | 7/1943 | Tinnerman | | |

(Continued)

FOREIGN PATENT DOCUMENTS

CN         101405511 A     4/2009

*Primary Examiner* — Roberta Delisle
(74) *Attorney, Agent, or Firm* — Harness, Dickey & Pierce, P.L.C.

(57) ABSTRACT

A speed nut for fastening a work piece to a stud includes a fastener plate defining an opening on a surface. The speed nut further includes a prong extending inwardly from an edge of the opening, the prong includes a root portion connecting with the fastener plate and a terminal end defining a single-threaded hole within the opening and configured to ratchet over threads of the stud. The root portion and the terminal portion are arranged offset from each other such that the prong plastically deforms in response to the work piece being removed from the stud.

16 Claims, 3 Drawing Sheets

(56) References Cited

U.S. PATENT DOCUMENTS

| | | | | |
|---|---|---|---|---|
| 2,355,486 | A | * | 8/1944 | Tinnerman .............. F16B 37/02 |
| | | | | 238/372 |
| 2,382,936 | A | * | 8/1945 | Bedford, Jr. ............ F16B 37/02 |
| | | | | 411/527 |
| 2,394,728 | A | * | 2/1946 | Tinnerman .............. F16B 37/02 |
| | | | | 411/527 |
| 2,399,958 | A | | 5/1946 | Tinnerman |
| 2,401,672 | A | * | 6/1946 | Tinnerman ............ F16B 5/0208 |
| | | | | 411/437 |
| 3,189,077 | A | | 6/1965 | Willis, Jr. et al. |
| 3,203,302 | A | * | 8/1965 | Frederick ................ F16B 37/02 |
| | | | | 29/446 |
| 3,523,299 | A | * | 8/1970 | Tinnerman .............. F16B 21/16 |
| | | | | 411/372 |
| 4,200,027 | A | * | 4/1980 | Oehlke ................ F16B 37/041 |
| | | | | 411/437 |
| 4,333,211 | A | * | 6/1982 | Gunther ................ F16B 37/041 |
| | | | | 411/175 |
| 4,911,594 | A | * | 3/1990 | Fisher .................... F16B 37/02 |
| | | | | 411/247 |
| 5,256,018 | A | * | 10/1993 | Rattmann ............. F16B 37/041 |
| | | | | 411/112 |
| 5,707,192 | A | | 1/1998 | Vortriede et al. |
| 5,906,464 | A | * | 5/1999 | Wedenig ............ F16B 37/0842 |
| | | | | 411/433 |
| 7,950,886 | B2 | * | 5/2011 | Siegal .................... E03D 11/16 |
| | | | | 411/107 |
| 8,210,786 | B2 | * | 7/2012 | Okada .................... F16B 37/02 |
| | | | | 411/437 |
| 2010/0011546 | A1 | | 1/2010 | Gelibert |

\* cited by examiner

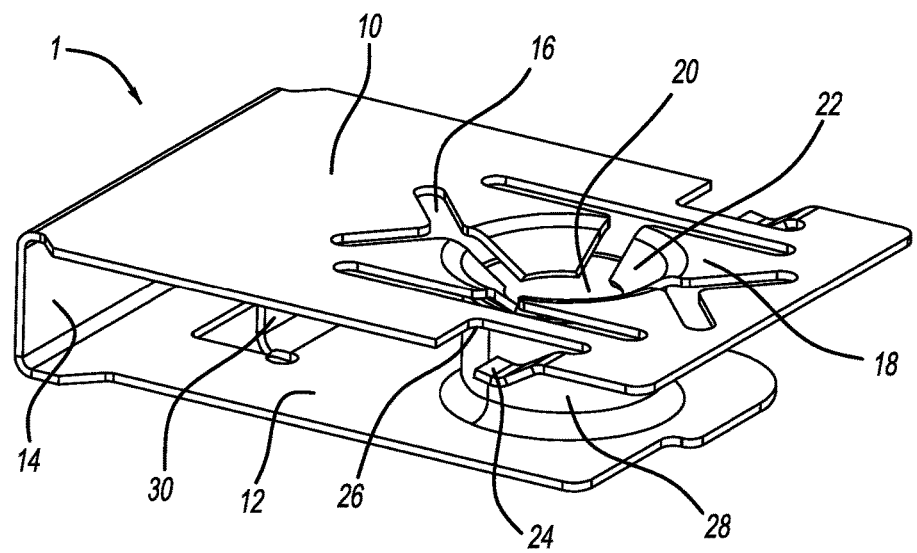
FIG - 1
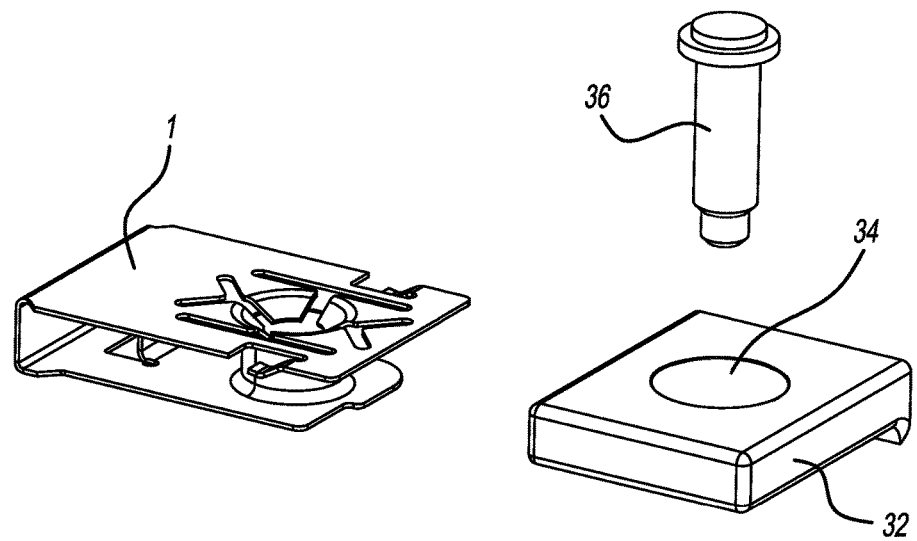
FIG - 2
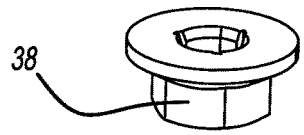

SPEED NUT

CROSS-REFERENCE TO RELATED APPLICATIONS

This application claims the benefit of U.S. Provisional Application No. 62/110,729, filed Feb. 2, 2015. The entire disclosure of the above application is incorporated herein by reference.

FIELD

The present disclosure relates to a speed nut for fastening a component to a support wall.

BACKGROUND

This section provides background information related to the present disclosure which is not necessarily prior art.

A speed nut is a type of fastener made of stamped spring steel. The speed nut has two or more flexible prongs extending toward each other and defines a fastening hole configured to engage with a stud. In an initial state, the fastening hole is designed a little smaller than a diameter of the stud in an initial state. Upon insertion of the stud into the fastening hole, the flexible prongs are plastically deformed so that the fastening hole is enlarged according to the diameter of the stud. The terminal portions of the flexible prongs ratchet over threads of the stud and apply a force to the stud to lock the speed nut to prevent the speed nut from loosening.

An example of this kind of embodiment is found in U.S. Pat. No. 5,707,192 (i.e., US '192). This patent shows a clip integrally equipped with a speed nut function for holding a component in place on the underside or side of an overhanging support structure. The component to be hung or suspended is formed with two or more flanges where the clip is inserted. The support structure is provided with plural studs to retain the component on its surface. Once the component is pushed against the support structure, the flange is automatically held in place on the studs. The speed nut of US '192 makes an operation easier while fastener nuts are threaded onto the studs because the clips on the flanges grip the studs to hold the component in place without human assistance.

However, there is a problem with the speed nut of US '192 when disassembling the component during a product service. Since the clips grip the stud rigidly, a large pull off force is required to remove the clips from the studs even after the fastener nuts are loosened off. This problem makes the operation difficult and costly to perform the product service.

SUMMARY

This section provides a general summary of the disclosure, and is not a comprehensive disclosure of its full scope or all of its features.

The present teachings provide for a speed nut for fastening a work piece to a stud. The speed nut includes a fastener plate defining an opening on a surface. The speed nut further includes a prong extending inwardly from an edge of the opening, the prong includes a root portion connecting with the fastener plate and a terminal end defining a single-threaded hole within the opening and configured to ratchet over threads of the stud. The root portion and the terminal portion are arranged offset from each other.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a J-clip nut;

FIG. 2 is a perspective view of the J-clip nut before assembling with a flange;

Corresponding reference numerals indicate corresponding parts throughout the several views of the drawings.

DETAILED DESCRIPTION

Figure 3:
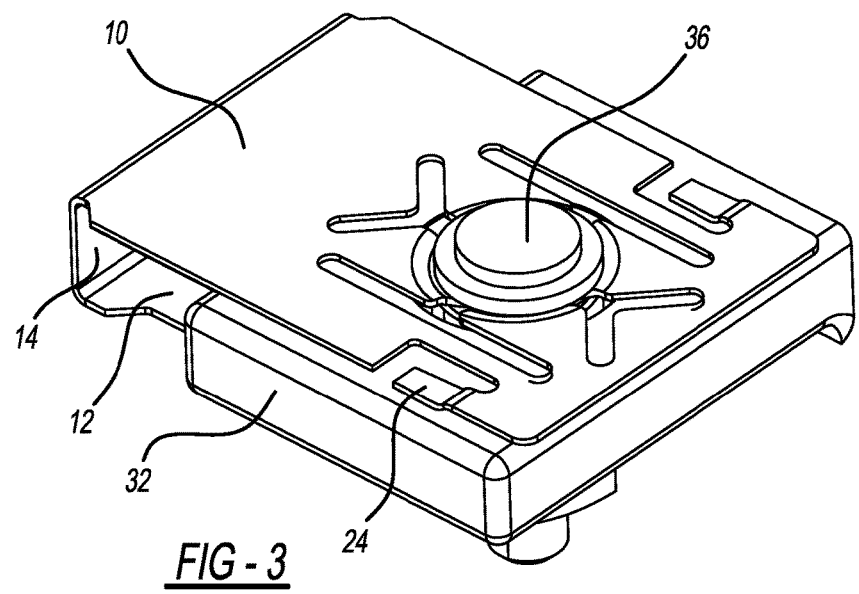
FIG. 3 is a front perspective view of the J-clip nut after assembling with the flange.

Example embodiments will now be described more fully with reference to the accompanying drawings.

With reference to FIG. 1, a J-clip nut 1 made of stamped spring steel is illustrated and may also be referred as a speed nut. The J-clip nut 1 is installed to a work piece to be mounted on an overhead support structure. The work piece may be a housing of a vehicle component, such an evaporator leak check module (ELCM), which is mounted to a vehicle chassis. The J-clip nut 1 includes a fastener plate 10, a clip plate 12, and a side plate 14 that are formed in a J-shape manner.

The fastener plate 10 has an opening 16 formed substantially in a rectangular shape. Four prongs 18 extend inwardly from different portions (e.g., corners) of the opening 16 toward each other to define a single-threaded hole 20. Each of the four prongs 18 bends to define a cone-shaped dent 22 such that the single-threaded hole 20 is in a plane different from the fastener plate 10. The fastener plate 10 further includes two contact arms 24 which extend downwardly from cut-out edges 26 of the fastener plate 10.

The clip plate 12 has a tubular wall 28 and a stopper 30. The tubular wall 28 is formed in a cylindrical shape extending upwardly from a through hole formed in the clip plate 12. The tubular wall 28 and the through hole are aligned coaxially with the single threaded hole 20. The stopper 30 rises upwardly from the surface of the clip plate 12.

The side plate 14 has a first end which connects with the fastener plate 10 and a second end which connects with the clip plate 12. The side plate 14 holds the fastener plate 10 and the clip plate 12 substantially in parallel. In other words, the fastener plate 10 and the clip plate 12 are arranged substantially in parallel and connected to each other with the side plate 14 at one end.

As shown in FIG. 2, the J-clip nut 1 is installed to a flange 32 integral with the work piece so that the fastener plate 10 and the clip plate 12 sandwiches the flange 32 therebetween. The tubular wall 28 of the clip plate 12 extends within a mount hole 34 defined in the flange 32. The flange 32 is fixed by a stud 36 which is provided depending from the overhead support structure (not shown). After installing the J-clip nut 1 to the flange 32, the stud 36 is inserted to the mount hole 34 of the flange 32. The single-threaded hole 20 ratchets over threads of the stud 36 and thus the flange 32 automatically held in place on the stud 36 without human assistance. Subsequently, a fastener nut 38 having a multi-threaded hole is tightened to the stud 36 to secure the flange 32 to the overhead support structure.

Figure 4:
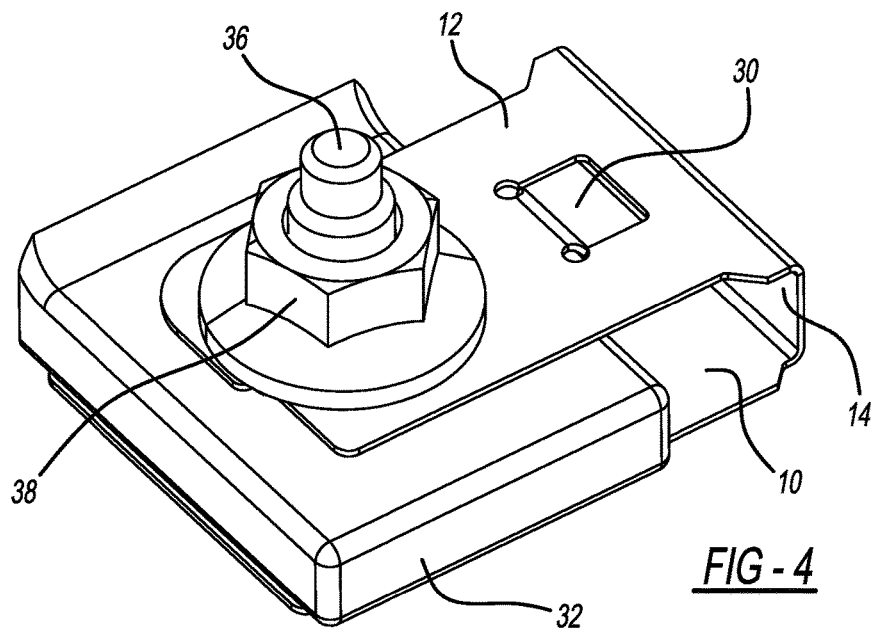
FIG. 4 is a rear perspective view of the J-clip nut after assembling with the flange.

FIGS. 3 and 4 illustrate the J-clip nut after fastening with the stud 36 and the fastener nut 38. As shown in FIG. 3, a head of the stud 36 sits on the cone-shaped dent defined by the prongs 18. The contact arms 24 provided from the fastener plate 10 contacts with the surface of the flange 32. As shown in FIG. 4, the fastener nut 38 is tightened to the stud to secure the flange 32 to the overhead support structure (not shown).

Figure 5:
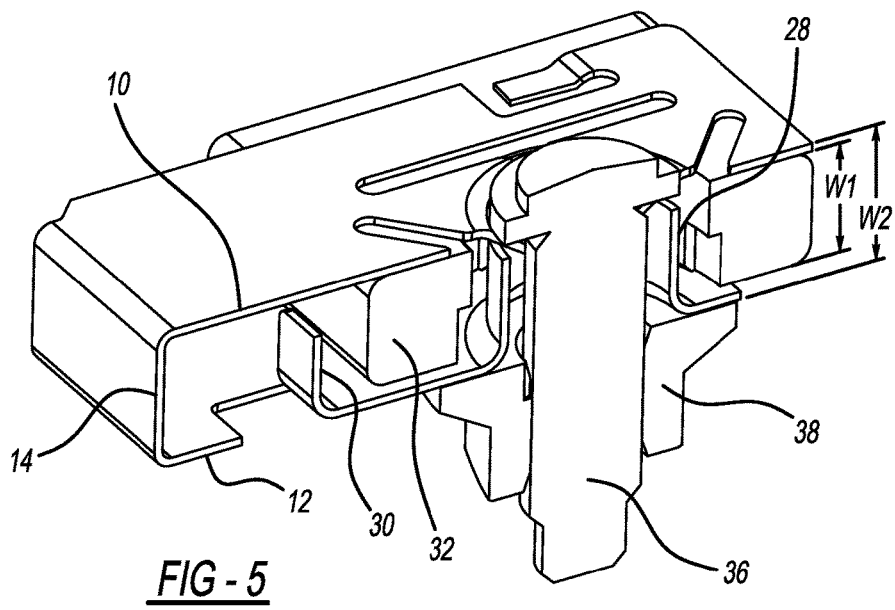
FIG. 5 is a cutaway view of the J-clip nut after assembling with the flange.

With referring to FIG. 5, the flange 32 has a thickness of W1. An opening end of the tubular wall 28 contacts with the prongs 18 to keep the fastener plate 10 and the clip plate 12 apart from each other. The thickness between the fastener plate 10 and the clip plate 12 is W2 which is set slightly greater than W1. During fastening the fastener nut 38, the fastener plate 10 and the clip plate 12 are compressed between the head of the stud 36 and the fastener nut 38. However, the compressive force is limited because of the tubular wall 28. Therefore, no overload which may cause damage is applied to the flange 32. The stopper 30 provided on the clip plate 12 restricts a relative rotation between the flange 32 and the J-clip nut 1 to keep a proper position.

Figure 6:
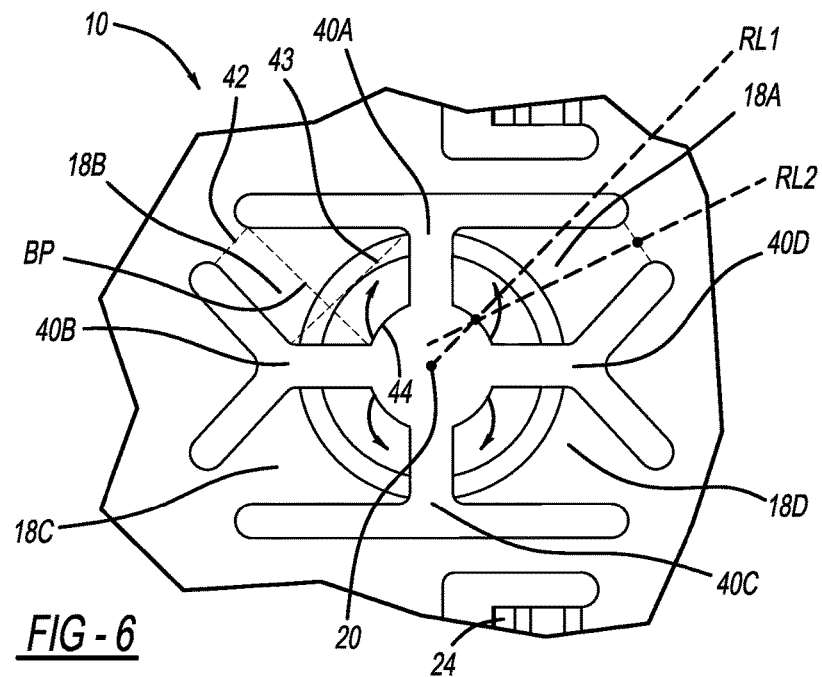
FIG. 6 is a front view of a fastener plate of the J-clip nut.

More detail of the fastener plate 10 will be described with reference to FIG. 6. There is a plurality of the prong 18 including a first prong 18A, a second prong 18B, a third prong 18C, and a fourth prong 18D. The first prong 18A and the second prong 18B are spaced with a first T-shaped slit 40A. The second prong 18B and the third prong 18C are spaced with a first Y-shaped slit 40B. The third prong 18C and the fourth prong 18D are spaced with a second T-shaped slit 40C. The fourth prong 18D and the first prong 18A are spaced with a second Y-shaped slit 40D. Each of the slits 40A-40D extends from the single-threaded hole 20.

Each of the four prongs has a root portion and a terminal end. The root portion 42 connects the prong 18 with the fastener plate 10. The terminal end 44 formed in an arc-shape manner to define a part of a single-threaded hole 20. Therefore, the single-threaded hole 20 is defined by four arc-shaped terminal ends 44. The root portion 42 and the terminal end 44 are arranged offset from each other. More specifically, a first radial line RL1 extends through a center of the threaded hole 20 and a center of the terminal end. A center of the root portion 42 is offset from the first radial line RL1. In other words, the first radial line RL1 does not pass through the center of the root portion 42. A second radial line RL2 extends through the center of the terminal end 44 and the center of the root portion 42. The second radial line RL2 and the first radial line RL1 create an angle greater than 0 degrees. The prong 18 has an asymmetric shape. The root portion 42 has a width that is smaller than a maximum width portion 43 of the prong 18. The maximum width portion 43 is closer to the single threaded hole 20 than the root portion 42. The width of the prong 18 increases from the root portion 42 toward the maximum width portion 43 and decreases from the maximum width portion 43 toward the terminal end 44.

When the work piece (e.g., ELCM) needs to be fixed or replaced in a product service, firstly the fastener nut 38 is loosen to remove the work piece from the overhead support structure (e.g., a vehicle chassis). However, the J-clip nut 1 still grips the threads of the stud 36 and thus the work piece is still held in place on the overhead support structure. To detach the work piece from the overhead support structure, the work piece is pulled off to disengage the single-thread hole 20 from the threads of the stud 36.

The prong 18 easily deforms plastically in response to the work piece being removed from the stud 36. The prong 18 is flipped along the bend path BP shown as a dashed line and deformed in the direction shown with arrows. The first prong 18A and the second prong 18B are configured to be deformed toward each other. The third prong 18C and the fourth prong 18D are configured to be deformed toward each other. The second prong 18B and the third prong 18C are configured to be deformed away from each other. The fourth prong 18D and the first prong 18A are configured to be deformed away from each other. As a result, the single-threaded hole 20 is enlarged to disengage from the threads of the stud 36 and there is no large pull off force is required in the product service.

In the above embodiment, the stud 36 is described as one having the threads on its shaft. Alternatively, the stud may have a plain cylindrical shaft without threads. The plain cylindrical shaft may have a lower stiffness than that of the prong 18. Despite the embodiment described above with the J-clip nut 1 having the clip plate 12, the present disclosure may be applied to a various types of speed nuts. For example, a speed nut may be made of a single metal sheet without a clipping function.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A speed nut for fastening a work piece to a stud, the speed nut comprising:
   a fastener plate defining an opening on a surface; and
   a plurality of prongs extending inwardly from an edge of the opening, each one of the plurality of prongs includes a root portion connecting with the fastener plate and a terminal end defining a single-threaded hole within the opening and configured to ratchet over threads of the stud, the opening is defined by the plurality of the prongs extending from opposite edges of the opening toward each other;
   wherein:
      the plurality of the prongs includes a first prong, a second prong, a third prong and a fourth prong that extend from different portions of the opening to form the single threaded hole;
      the first prong and the second prong are spaced with a first T-shaped slit;
      the second prong and the third prong are spaced with a first Y-shaped slit;
      the third prong and the fourth prong are spaced with a second T-shaped slit;
      the fourth prong and the first prong are spaced with a second Y-shaped slit; and
      the first T-shaped slit, the first Y-shaped slit, the second T-shaped slit, and the second Y-shaped slit extend from the single-threaded hole.

2. The speed nut according to claim 1, wherein a first radial line extends through a center of the threaded hole and a center of the terminal end, a center of the root portion is offset from the first radial line.

3. The speed nut according to claim 2, wherein a second radial line extends through the center of the terminal end and the center of the root portion, the second radial line and the first radial line create an angle greater than 0 degrees.

4. The speed nut according to claim 1, wherein at least one of the plurality of prongs has an asymmetric shape.

5. The speed nut according to claim 1, wherein the root portion has a width that is smaller than that of a maximum width portion of each one of the plurality of prongs, and the maximum width portion is closer to the single-threaded hole than the root portion.

6. The speed nut according to claim 1, wherein each one of the plurality of prongs bends such that the single-threaded hole is in a plane different from the fastener plate.

7. The speed nut according to claim 1, wherein
the first prong and the second prong are configured to be deformed toward each other;
the third prong and the fourth prong are configured to be deformed toward each other;
the second prong and the third prong are configured to be deformed away from each other; and
the fourth prong and the first prong are configured to be deformed away from each other.

8. The speed nut according to claim 1, further comprising:
a clip plate arranged substantially in parallel to the fastener plate; and
a side plate connecting one end of the clip plate and one end of the fastener plate,
wherein the clip plate and the side plate are formed in a J-shape integrally with the fastener plate such that the work piece is configured to be sandwiched between the clip plate and the fastener plate.

9. The speed nut according to claim 8, wherein the clip plate has a through hole that is coaxially aligned with the single-threaded hole.

10. The speed nut according to claim 9, wherein the clip plate has a tubular wall that extends from the through hole toward the opening, the tubular wall has a height sufficient to limit a compressive force applied by a fastener nut threaded onto the stud.

11. A speed nut for fastening a work piece to a stud, the speed nut comprising:
a fastener plate defining an opening; and
a plurality of prongs extending inwardly from an edge of the opening, each one of the plurality of prongs includes a root portion connecting with the fastener plate and a terminal portion defining a single-threaded hole within the opening and configured to ratchet over threads of the stud, the opening is defined by the plurality of the prongs extending from opposite edges of the opening toward each other;
wherein:
the plurality of the prongs includes a first prong, a second prong, a third prong and a fourth prong that extend from different portions of the opening to form a single threaded hole;
the first prong and the second prong are configured to be deformed toward each other;
the third prong and the fourth prong are configured to be deformed toward each other;
the second prong and the third prong are configured to be deformed away from each other; and
the fourth prong and the first prong are configured to be deformed away from each other.

12. A speed nut for fastening a work piece to a stud, the speed nut comprising:
a fastener plate defining an opening;
a prong extending inwardly from an edge of the opening, the prong includes a root portion connecting with the fastener plate and a terminal portion defining a single-threaded hole within the opening and configured to ratchet over threads of the stud;
a clip plate arranged substantially in parallel to the fastener plate; and
a side plate connecting one end of the clip plate and one end of the fastener plate;
wherein the clip plate and the side plate are formed in a J-shape integrally with the fastener plate such that the work piece is configured to be sandwiched between the clip plate and the fastener plate.

13. A speed nut for fastening a work piece to a stud, the speed nut comprising:
a fastener plate defining an opening on a surface; and
a plurality of prongs extending inwardly from an edge of the opening, each one of the plurality of prongs includes a root portion connecting with the fastener plate and a terminal end defining a single-threaded hole within the opening and configured to receive the stud, the opening is defined by the plurality of the prongs extending from opposite edges of the opening toward each other;
wherein:
the plurality of the prongs includes a first prong, a second prong, a third prong and a fourth prong that extend from different portions of the opening to form the single threaded hole;
the first prong and the second prong are spaced with a first T-shaped slit;
the second prong and the third prong are spaced with a first Y-shaped slit;
the third prong and the fourth prong are spaced with a second T-shaped slit;
the fourth prong and the first prong are spaced with a second Y-shaped slit; and
the first T-shaped slit, the first Y-shaped slit, the second T-shaped slit, and the second Y-shaped slit extend from the single-threaded hole.

14. The speed nut of claim 13, wherein the stud has a non-threaded shaft.

15. The speed nut of claim 14, wherein the non-threaded shaft is less stiff than the plurality of prongs.

16. The speed nut of claim 15, wherein the non-threaded shaft is cylindrical.

* * * * *